United States Patent
Lee

(10) Patent No.: US 9,575,924 B2
(45) Date of Patent: Feb. 21, 2017

(54) APPARATUS AND METHOD FOR CONTROLLING EXTERNAL DEVICE

(75) Inventor: Do-Hyung Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/214,567

(22) Filed: Aug. 22, 2011

(65) Prior Publication Data

US 2012/0047304 A1    Feb. 23, 2012

(30) Foreign Application Priority Data

Aug. 20, 2010   (KR) .................. 10-2010-0080931

(51) Int. Cl.
| | | |
|---|---|---|
| *G06F 13/14* | (2006.01) | |
| *G06F 13/42* | (2006.01) | |
| *G06F 3/00* | (2006.01) | |

(52) U.S. Cl.
CPC .......... *G06F 13/4282* (2013.01); *G06F 3/002* (2013.01)

(58) Field of Classification Search
CPC ....... G06F 1/266; G06F 9/4411; H02J 7/0047
USPC ........ 710/305–306, 100, 15, 10, 8; 711/103; 715/746
See application file for complete search history.

(56) References Cited

U.S. PATENT DOCUMENTS

| | | | |
|---|---|---|---|
| 6,427,177 B1* | 7/2002 | Chang ............................. | 710/8 |
| 8,028,290 B2* | 9/2011 | Rymarczyk et al. ......... | 718/104 |
| 2003/0110331 A1* | 6/2003 | Kawano et al. ................. | 710/58 |
| 2005/0268000 A1 | 12/2005 | Carlson | |
| 2006/0192689 A1 | 8/2006 | Wang et al. | |
| 2007/0050770 A1* | 3/2007 | Geisinger ..................... | 718/100 |
| 2007/0195962 A1 | 8/2007 | Kim et al. | |
| 2008/0010446 A1* | 1/2008 | Kim ........................ | G06F 9/441 713/2 |
| 2008/0273297 A1* | 11/2008 | Kumar .......................... | 361/680 |
| 2008/0320197 A1 | 12/2008 | Kumar | |
| 2009/0031329 A1* | 1/2009 | Kim ........................ | G06F 9/461 719/327 |
| 2009/0091422 A1* | 4/2009 | Minoo et al. .................. | 340/5.8 |
| 2009/0216916 A1* | 8/2009 | Jang et al. ...................... | 710/22 |
| 2009/0228868 A1 | 9/2009 | Drukman et al. | |
| 2010/0011133 A1* | 1/2010 | Takano .......................... | 710/10 |
| 2010/0060549 A1* | 3/2010 | Tsern ............................ | 345/2.1 |

FOREIGN PATENT DOCUMENTS

| | | |
|---|---|---|
| CN | 1313968 A | 9/2001 |
| CN | 1527215 A | 9/2004 |

(Continued)

OTHER PUBLICATIONS

Korean Search Report, dated May 17, 2016.

*Primary Examiner* — Tim T Vo
*Assistant Examiner* — Kim Huynh
(74) *Attorney, Agent, or Firm* — Cha & Reiter, LLC

(57) ABSTRACT

Provided is a terminal for controlling an external device, not equipped with its own memory or controller, connected to the terminal. The portable terminal, when being connected to at least one external device, changes its setting with an extracted setting data matching the connected external device. Accordingly, the connected external device in a connection state to the portable terminal performs corresponding operations under control of the portable terminal.

22 Claims, 4 Drawing Sheets

(56) References Cited

FOREIGN PATENT DOCUMENTS

| CN | 1794212 A | 6/2006 | |
|---|---|---|---|
| CN | 101105755 A | 1/2008 | |
| CN | 101354655 A | 1/2009 | |
| CN | 201327514 Y | 10/2009 | |
| CN | 201657039 U | 11/2010 | |
| KR | 10-2007-0078618 A | 8/2007 | |
| KR | 2009-037061 | 4/2009 | ............ G06F 3/048 |

* cited by examiner

APPARATUS AND METHOD FOR CONTROLLING EXTERNAL DEVICE

CLAIM OF PRIORITY

This application claims the benefit under 35 U.S.C. §119 of a Korean Patent Application filed in the Korean Intellectual Property Office on Aug. 20, 2010 and assigned Serial No. 10-2010-0080931, the entire disclosure of which is hereby incorporated by reference.

BACKGROUND OF THE INVENTION

1. Field of the Invention

The present invention generally relates to an apparatus and method for controlling an external device, and more particularly, to an apparatus and method for controlling an external device in communication with a portable terminal.

2. Description of the Related Art

With the recent development of platforms for smart phones, infrastructure hardware (HW) and software (SW) techniques relating to smart phones have been developed rapidly.

Controllers for smart phones are now evolving to multi-core. Various Operating Systems (Oss) such as Windows Mobile (WM), iPhone OS, Android, LiMo, etc., are also introduced in the current market.

Currently, when the smart phone is connected to an external device such as a TV or display for enhanced larger view, data of the smart phone is merely output to the external device.

SUMMARY OF THE INVENTION

Accordingly, an aspect of the present invention is to provide an apparatus and method for controlling an external device in a portable terminal.

Another aspect of the present invention is to provide an apparatus and method for controlling an external device using a portable terminal, which serves to function as a controller and a memory for the connected external device.

Another aspect of the present invention is to provide an apparatus and method for controlling an external device via a portable terminal, thereby allowing users to easily use extended functions and services of the external device.

Another aspect of the present invention is to provide an apparatus and method for controlling an external device via a portable terminal, thereby making it easy to keep and update data.

According to an aspect of the present invention, an apparatus for controlling an external device via a portable terminal coupled to a plurality of external devices is provided. The portable terminal, when being connected to at least one external device, extracts setting data corresponding to the connected external device to control corresponding operation and overall functions of the connected external device via the portable terminal.

According to another aspect of the invention, a mobile terminal for controlling a plurality of external devices connected thereto includes: a memory, and a controller for controlling at least one external device connected to the terminal by detecting a type of the connected external device and extracting setting data corresponding to the detected external device type from the memory to control functions of the connected external device via the terminal, wherein the connected external device is not equipped with its own memory or controller.

According to another aspect of the present invention, a method for controlling an external device using a portable terminal includes: when at least one external device are connected to the portable terminal, determining types of the connected external device, and when recognized, extracting setting data corresponding to the external devices to control the connected external device.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION OF THE INVENTION

Figure 1:
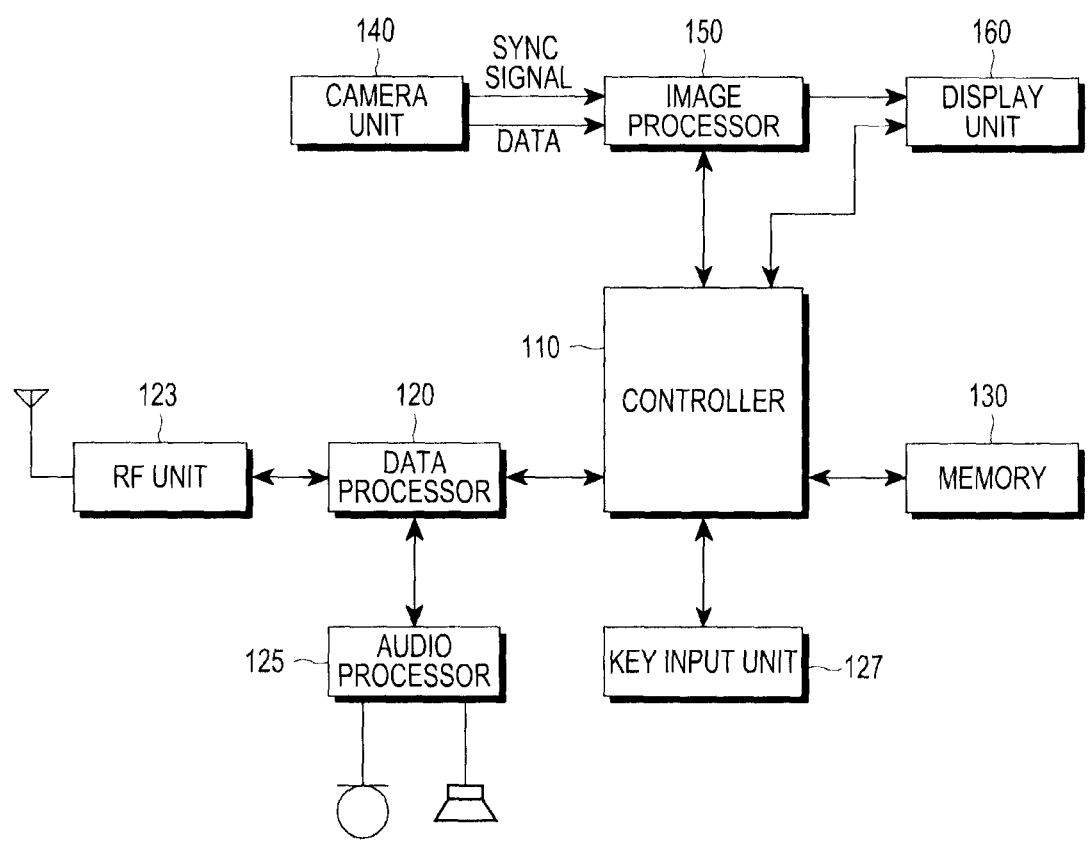
FIG. 1 is a block diagram of a portable terminal according to an exemplary embodiment of the present invention.

Hereinafter, an exemplary embodiment of the present invention will be described in detail with reference to the accompanying drawings. Throughout the drawings, like components will be indicated by like reference numerals.

FIG. 1 is a block diagram of a portable terminal according to an exemplary embodiment of the present invention.

Referring to FIG. 1, a Radio Frequency (RF) unit 123 performs a wireless communication function of the portable terminal. The RF unit 123 includes an RF transmitter for up-converting a frequency of a transmission signal and amplifying the transmitted signal, and an RF receiver for low-noise amplifying a received signal and down-converting the frequency of the received signal. A data processor 120 includes a transmitter for encoding and modulating the transmission signal, and a receiver for demodulating and decoding the received signal. The data processor 120 may include a modem and a codec. Herein, the codec includes a data codec for processing packet data and an audio codec for processing an audio signal such as voice. An audio processor 125 reproduces an audio signal being output from the audio codec of the data processor 120 or transmits an audio signal generated from a microphone to the audio codec of the data processor 120.

A key input unit 127 includes keys for inputting numeric and character information and function keys for setting various functions.

A memory 130 includes program and data memories. The program memory stores programs for controlling a general operation of the portable terminal and programs for changing an environment of the portable terminal corresponding to a type of a connected external device and then controlling the external device using the portable terminal. The data memory temporarily also stores data generated during execution of the programs.

The memory 130 pre-stores setting data corresponding to the types of the external devices according to an embodiment of the present invention. Here, the setting data may include an Operating System (OS) and a User Interface (UI) of the connected external device as well as a function/ software responsive to the external device. That is, the OS and the UI are setting data for an external output device connected to the portable terminal; the function is setting data for an external device connected to the portable terminal and is controlled by the connected external device, instead of through the key input unit 127 provided in the portable terminal. Here, the external device may be an external input device such as a key input device, an external output device such as a display device, or an external device which includes input/output devices without a controller and a memory such as a PC or a notebook which includes input/output devices without a controller and a memory.

The memory 130 may store data generated during control of the external device using the portable terminal according to an embodiment of the present invention.

A controller 110 controls overall operation of the portable terminal.

According to an embodiment of the present invention, when at least one external device is connected to the portable terminal, the controller 110 automatically recognizes the connected external device, determines a type of the external device, and configures by extracting the setting data that matches the connected external device from the memory 130 and controls the connected external device by using the extracted setting data.

That is, once an external input device and an external output device are connected to the portable terminal, the controller 110 extracts setting data for the connected external output device from the memory, i.e., the OS and the UI, then utilizes the extracted OS and UI to operate the connected external output device. Further, the controller 110 extracts the setting data for the connected external input device, i.e., the function, to control the connected external input device.

Accordingly, the controller 110 outputs the corresponding function executed through the input operation of on the connected external output device with the extracted OS and the UI.

According to an embodiment of the present invention, the controller 110 may also store data generated by controlling of the external device in the memory 130 after the portable terminal is adopted to operate with setting data of the connected external device.

A camera unit 140 captures an image, and may include a camera sensor for converting an optical signal of the captured image into an electrical signal, and a signal processor for converting an analog image signal of the image captured by the camera sensor into digital data. Herein, it is assumed that the camera sensor is a Charge Coupled Device (CCD) sensor or a Complementary Metal Oxide Semiconductor (CMOS) sensor, and the signal processor may be implemented as a Digital Signal Processor (DSP). In addition, the camera sensor and the signal processor may be implemented as one piece or separately.

An image processor 150 performs Image Signal Processing (ISP) to display an image signal output from the camera unit 140 on the display unit 160. The ISP executes functions such as gamma correction, interpolation, space conversion, image effect, image scale, Auto White Balance (AWB), Auto Exposure (AE) and Auto Focus (AF). Thus, the image processor 150 processes the image signal output from the camera unit 140 in the unit of a frame, and outputs frame image data adaptively to the features and size of the display unit 160. The image processor 150 includes an image codec, and compresses the frame image data displayed on the display unit 160 in a preset manner or restores the compressed frame image data to the original frame image data. Herein, the image codec may be Joint Picture Experts Group (JPEG) codec, Moving Picture Experts Group 4 (MPEG4) codec, or Wavelet codec. It is assumed that the image processor 150 has an on screen display (OSD) function. The image processor 150 may output OSD data according to the displayed picture size under the control of the controller 110.

The display unit 160 displays an image signal output from the image processor 150 on the screen and displays user data output from the controller 110. Herein, the display unit 160 may be a Liquid Crystal Display (LCD). The display unit 160 may include an LCD controller, a memory capable of storing image data, an LCD element, and so on. When the LCD is implemented with a touch screen, it may serve as an input unit. In this case, on the display unit 160, keys such as the key input unit 127 may be displayed.

In sum, when an external output device is connected to the portable terminal, the controller 110 of the terminal extracts setting data for the connected external output device, i.e., the OS and the UI, from the memory 130 and configures the portable terminal to operate the connected external device with the extracted OS and UI. Accordingly, the controller 110 can output a corresponding function executed through an input operation of the key input unit 127 of the terminal on the external output device. In addition, when the external input device is connected to the portable terminal, the controller 110 extracts the setting data for the connected input device from the memory 130. The controller 110 then outputs a corresponding function executed through an input operation of the external input device on a display unit 160 of the portable terminal.

Figure 2:
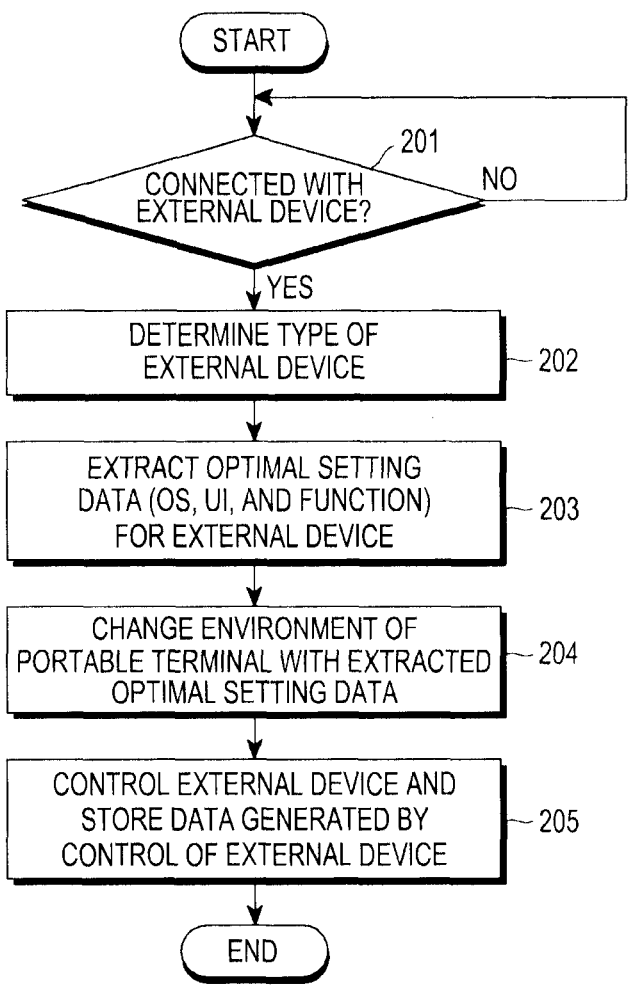
FIG. 2 is a flowchart illustrating an operation of controlling an external device in a portable terminal according to an exemplary embodiment of the present invention.

With reference to FIG. 2, a description will now be made of an operation of controlling an external device in the portable terminal structured as described above.

FIG. 2 is a flowchart illustrating an operation of controlling an external device in the portable terminal according to an exemplary embodiment of the present invention.

Referring to FIGS. 1 and 2, once at least one external device is connected to the portable terminal, the controller 110 automatically recognizes connection of the external device in step 201, and determines a type of the connected external device in step 202. One skilled in the art can readily recognize how to determine the types of external devices connected to the portable terminal. For example, when the information on the types of external devices and corresponding voltage values is already stored in the portable terminal, it is possible to determine the type of an external device connected to the portable terminal based on the voltage that develops in the external device.

The portable terminal and the external device may be connected in a wired or wireless manner.

After the controller 110 determines the type of the external device connected to the portable terminal in step 202, the controller 110 extracts setting data corresponding to the connected external device from the memory 130 in step 203. Here, the information on the types of external devices and corresponding setting data is already pre-stored in the memory 130 of the portable terminal. Accordingly, when an external device is connected to the portable terminal the controller 110 extracts the setting data for the connected external device from the memory 130. The optimal setting data may include an Operating System (OS) and a User Interface (UI), or other function/software according to the type of the external device.

After the controller 110 extracts the setting data corresponding to the connected external device from the memory 130 in step 203, the controller 110 changes an environment of the portable terminal with the extracted setting data in order to directly control the external device in step 204. For example the information on External Terminal 1, External Terminal 2, OS1 corresponding to External Terminal 1 and OS2 corresponding to External Terminal 2 are already stored in the memory of the portable terminal. In this case, when External Terminal 1 is connected to the portable terminal, the controller of the terminal changes the current OS of the portable terminal to OS1. That is, the portable terminal has plural OSs and UIs, and depending on the type of an external terminal connected to the portable terminal, the controller can change the current OS to a corresponding OS matching the external device.

In step 204, the controller 110 changes the OS and the UI of, or the function of the portable terminal into the OS and the UI of, or the function corresponding to the connected external device.

Thus, in the environment of the portable terminal, which is changed with the setting data of the external device, the controller 110 controls the external device and stores data generated during an operation of the external device in step 205 in the memory.

When an external output device and an external input device are connected to the portable terminal, an OS and an UI corresponding the external output device and a function corresponding to the external input device are replaced in the terminal, such that the controller 110 can directly control the external output device to output a function in the terminal that corresponds to an input operation of the external input device in step 205. In step 205, the controller 110 may also store data generated by controlling of the external output device and the external input device in the memory 130.

Similarly, when the external output device is connected to the portable terminal, the controller 110 controls the external output device to output a function corresponding to an input operation of the key input unit 127 of the portable terminal in step 205. In step 205, the controller 110 may also store data generated by controlling of the external output device in the memory 130.

Furthermore, when the external input device is connected to the portable terminal, the controller 110 controls the display device 160 to output a function corresponding to an input operation of the external input device in step 205. In step 205, the controller 110 may also store data generated by controlling of the external input device in the memory 130.

Figure 3A:
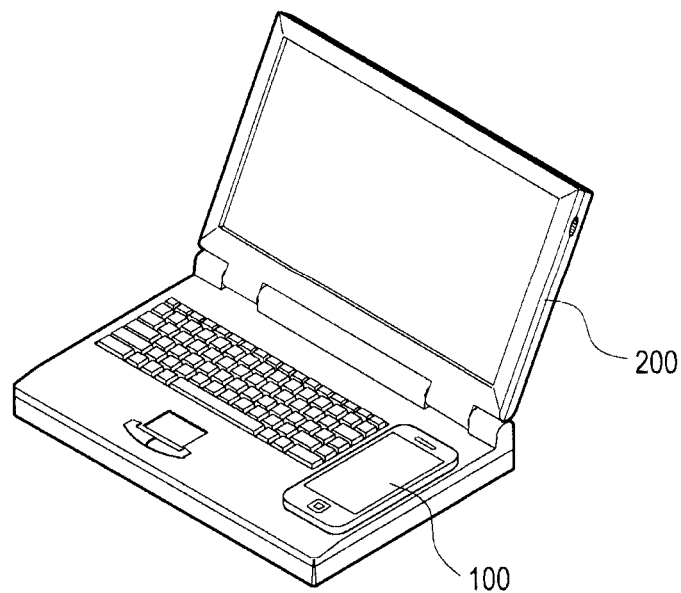
FIGS. 3A through 3C are diagrams for describing control of an external device in a portable terminal according to an exemplary embodiment of the present invention.
Figure 3B:
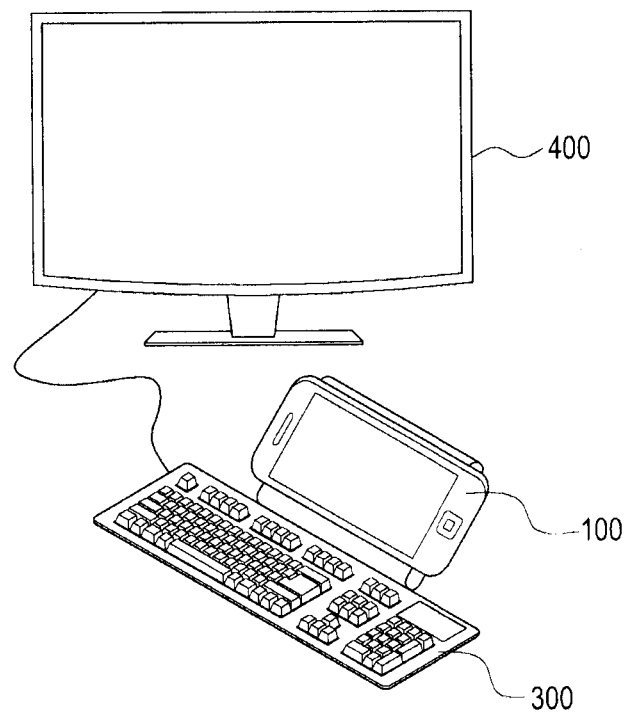
Figure 3C:
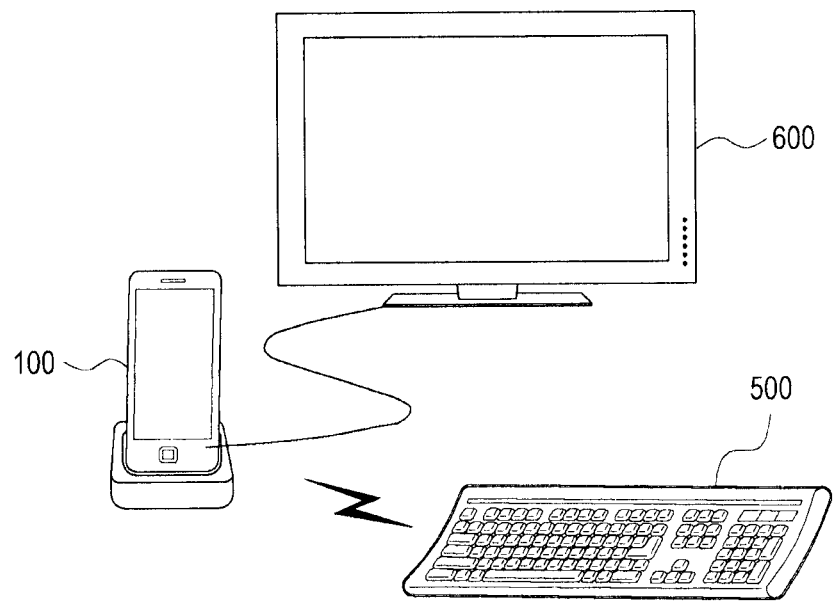

FIGS. 3A through 3C are diagrams for describing control of an external device in the portable terminal according to an exemplary embodiment of the present invention to describe in more detail the process shown in FIG. 2.

In FIG. 3A, a portable terminal 100 is connected to an external device, i.e., notebook 200, which does not include a controller and a memory, but just includes input and output devices. In FIG. 3A, once the notebook 200 and the portable terminal 100 are connected with each other, the portable terminal 100 is updated with setting data (an OS, a UI, and a function) of the notebook 200.

The portable terminal 100 changed with the setting data of the notebook 200 can now function as a controller of the notebook 200 to control a display unit of the notebook 200 and to display a function corresponding to an input operation of a key input unit of the notebook 200. Once storage of data generated by controlling of the notebook 200 is selected, the portable terminal 100 stores the data in the memory 130, thus functioning as a memory of the notebook 200.

In FIG. 3B, the portable terminal 100 is connected with a display device 400 and a key input device 300 of a PC, which does not include a main body including a controller and a memory.

In FIG. 3B, once the display device 400 and the key input device 300 of the PC are connected with the portable terminal 100, the portable terminal 100 extracts pre-stored setting data (an OS, a UI, and a function) of the display device 400 and the key input device 300 of the PC.

Thereafter, the portable terminal 100 functions as a controller of the display device 400 and the key input device 300 of the PC, thus able to control the display device 400 of the PC to display a function corresponding to an input operation of the key input device 300 of the PC.

Further, the data generated by the display device during operation is stored in the memory 130, thus functioning as a memory of the display device 400 and the key input device 300 of the PC.

In FIG. 3C, the portable terminal 100 is connected with a display device 600 and a wireless key input device 500 of a TV.

In FIG. 3C, once the portable terminal 100 is connected with the display device 600 and the wireless key input device 500 of the TV, the setting data (an OS, a UI, and a function) for the display device 600 and the wireless key input device 500 of the TV are extracted.

The portable terminal 100, using the extracted data, functions as a controller for the display device 600 and the wireless key input device 500 of the TV, thus controlling the display device 600 display a function corresponding to an input operation of the wireless key input device 500.

Data generated by controlling of the display device 600 and the wireless key input device are stored in the memory 130. Thus, the memory 130 of the terminal serves as a memory for the display device 600 and the wireless key input device 500.

As can be seen from the foregoing description, by providing an apparatus and method for controlling an external device which is connected to a portable terminal, the terminal serves to control the external device by functioning as a controller and a memory for the connected device. As a result, external device having neither controller nor memory can be provided to users at low cost as an accessory because the portable terminal can take over the overall control of the respective external device. Further, users can easily use extended functions and services and easily keep and update data using the terminal.

In addition, the above-described methods according to the present invention can be realized in hardware or as software or computer code that can be stored in a non-transitory recording medium such as a CD ROM, a RAM, thumbnail drive, a floppy disk, a flash storage, a hard disk, or a magneto-optical disk or downloaded over a network and stored in storage, so that the methods described herein can be executed by such software using a general purpose computer, special computer, microprocessor, special processor, or in a programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While a detailed embodiment such as a portable terminal has been described in the present invention, various changes may be made without departing from the scope of the present invention. Accordingly, the scope of the present invention should be defined by the claims and equivalents thereof, rather than the described embodiment.

What is claimed is:

1. A portable device for controlling a plurality of external devices connectable thereto, comprising:
    a memory for storing a plurality of Operating Systems (OSs) and User Interfaces (UIs) and data associating each of the plurality of external devices with one of the OSs and one of the UIs; and
    a controller for detecting a connection to at least one external device, and in response to detecting the connection, determining a type of the connected external device and extracting an OS and UI that matches the connected external device from among the plurality of OSs and UIs stored in the memory, wherein a current OS and UI of the portable device are replaced by the extracted OS and UI, and functions of the connected external device are controlled via the portable device by using the extracted OS and UI.

2. A portable device for controlling a plurality of external devices connectable thereto, comprising:
    a memory for storing a plurality of Operating Systems (OSs) and User Interfaces (UIs) corresponding to the plurality of external devices; and
    a controller for detecting a connection to at least one external device, and upon detection, extracting an OS and UI that matches the connected external device from the memory to enable a control of functions of the connected external device, wherein a current OS and UI of the portable device is replaced by the extracted OS and UI,
    wherein the controller automatically recognizes a type of the connected external device based on a voltage level of the connected external device.

3. The portable device of claim 1, wherein the at least one external device is connected in a wired or wireless manner.

4. The portable device of claim 1, wherein the controller stores data generated during an operation of the connected external device in the memory.

5. The portable device of claim 1, wherein the connected external device is in the form of a notebook computer.

6. The portable device of claim 1, wherein the connected external device is a television including: a keyboard functioning as an input unit of the television, and a television display, wherein functions of the television are controlled according to input operations of the input unit, through control by the controller.

7. The portable device of claim 1, wherein setting data is extracted from the memory that matches the connected external device, the setting data comprises at least one function related to an input unit and a display of the external device.

8. The portable device of claim 1, wherein the connected external device is not equipped with its own memory or controller.

9. A method in a portable device for controlling an external device, the method comprising:
    storing in memory a plurality of Operating Systems (OSs) and User Interfaces (UIs) and data associating each of a plurality of external devices with one of the OSs and one of the UIs;
    in response to detecting that at least one external device is connected to the portable device, determining a type of the connected external device and extracting an OS and UI that matches the connected external device from among the plurality of OSs and UIs stored in the memory, wherein a current OS and UI of the portable device are replaced by the extracted OS and UI; and
    controlling functions of the connected external device via the portable device by using the extracted OS and UI.

10. The method of claim 9, wherein determining the connected external device type is achieved based on a voltage level of the connected external device.

11. The method of claim 9, further comprising storing data generated during an operation of the detected external device in the memory of the portable device.

12. The method of claim 9, wherein the connected external device is connected to the portable device in a wired or wireless manner.

13. The method of claim 9, wherein the connected external device is in the form of a notebook computer.

14. The method of claim 9, wherein the connected external device is a computing device or television comprising an input unit and a display which is larger than a display of the portable device, and wherein functions of the connected device are controlled according to input operations of the input unit of the connected device, through control by the portable device.

15. The method of claim 9, wherein setting data is extracted from the memory that matches the connected external device, the setting data comprises at least one function related to an input unit and a display of the external device.

16. The method of claim 9, wherein the external device is devoid of its own memory and controller.

17. The method of claim 14, wherein the connected external device is a television including: a keyboard functioning as the input unit, and a television display.

18. The method of claim 17, wherein the keyboard is a wireless keyboard.

19. The method of claim 17, wherein the television is devoid of its own memory and controller.

20. The portable device of claim 6, wherein the television is devoid of its own memory and controller.

21. The portable device of claim 1, wherein the current OS is a first type of portable terminal OS and the extracted OS is a second type of portable terminal OS.

22. The portable device of claim 21, wherein the current OS is one of Windows Mobile, iPhone OS, Android and LiMo, and the extracted OS is another one of Windows Mobile, iPhone OS, Android and LiMo.

* * * * *